FIG. I

INVENTORS
JOHN P. SIBILIA
CYRIL WOOLF
BY JOHN FRANK

Stanley M. Tengland
ATTORNEY

United States Patent Office 3,657,362
Patented Apr. 18, 1972

3,657,362
PROCESS FOR PREPARING α,ω-BIS (FLUOROPERHALOISOPROPOXY) PERFLUOROALKANES
John P. Sibilia, Livingston, and Cyril Woolf and John Frank, Morristown, N.J., assignors to Allied Chemical Corporation, New York, N.Y.
Filed Dec. 17, 1969, Ser. No. 885,776
Int. Cl. C07c 41/00
U.S. Cl. 260—615 R
7 Claims

ABSTRACT OF THE DISCLOSURE

α,ω - Bis(fluoroperhaloisopropoxy) perfluoroalkanes useful as dielectric coolants are prepared by the pyrolytic dimerization of α-(fluoroperhaloisopropoxy)-ω-iodoperfluoroalkanes.

BACKGROUND OF THE INVENTION

This invention relates to a process for preparing α,ω-bis(fluoroperhaloisopropoxy)perfluoroalkanes by the pyrolytic dimerization of α-(fluoroperhaloisopropoxy)-ω-iodoperfluoroalkanes.

U.S. Pat. 3,435,078 discloses α,ω-bis(fluoroperhaloisopropoxy)perfluoroalkanes having the formula

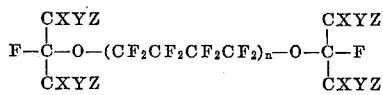

wherein X, Y, and Z are independently fluorine or chlorine, with the total number of fluorine atoms on each isopropoxy group being at least three, and $n$ is an integer from 1 to 5. The patent further discloses that these compounds are useful as thermally stable dielectric coolants. The method employed in the patent to prepare these compounds involves reacting an α-(fluoroperhaloisopropoxy)-ω-iodoperfluoroalkane with zinc in the presence of a solvent.

It is an object of this invention to provide an improved method of preparing such α,ω-bis(fluoroperhaloisopropoxy) perfluoroalkanes.

SUMMARY OF THE INVENTION

In accordance with this invention, α,ω-bis(fluoroperhaloisopropoxy)perfluoroalkanes having the formula

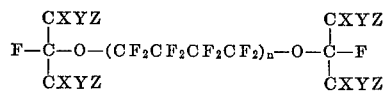

wherein X, Y, and Z are independently fluorine or chlorine, with the total number of fluorine atoms on each isopropoxy group being at least three, and $n$ is an integer from 1 to 5, are prepared by passing an α-(fluoroperhaloisopropoxy)-ω-iodoperfluoroalkane having the formula

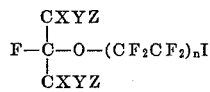

wherein X, Y, Z, and $n$ have the meanings given above, through a reaction zone having a temperature between about 450° C. and about 900° C.

The process of this invention offers several advantages over the process employed in U.S. Pat. 3,435,078; in particular, the process of this invention affords a rapid, continuous process for preparing the desired product without the consumption of zinc or solvent.

In passing through the reaction zone the α-(fluoroperhaloisopropoxy - ω - iodoperfluoroalkane (sometimes referred to herein as the monomer) is dimerized, with the elimination of $I_2$, to form the α,ω-bis(fluoroperhaloisopropoxy) perfluoroalkane (sometimes referred to herein as the dimer).

The temperature in the reaction zone is important. Conversion of the monomer to the dimer does not occur appreciably at temperatures below 450° C. At temperatures above 900° C. the principal reaction products are lower decomposition products and the yield of dimer is impractically low. In the laboratory, optimum production of dimer occurs at temperatures between about 600 and 700° C., but increasing the temperatures in the reaction zone generally decreases the yield of dimer based on the amount of monomer consumed. Consequently, in the commercial practice of this invention where unreacted monomer is recovered and recycled, it may be desirable to operate at temperatures below 600° C. The preferred temperature range is from about 450° C. to about 750° C.

Conversion of the monomer to the dimer can be achieved with a residence time as low as 0.02 second. Increasing the residence time has the effect of decreasing the amount of unreacted monomer exiting from the reaction zone, but longer residence times also favor the formation of reaction products other than the dimer. The residence time is preferably less than 100 seconds. In laboratory operations, optimum production of dimer is obtained with a residence time between about 1 and 15 seconds, but in commercial operations, the optimum residence time depends on the balance struck between such economic factors as the cost of the monomer and the expense of recovering and recycling unreacted monomer. Taking into account such commercial considerations, the preferred residence time is from about 0.1 to about 15 seconds.

The monomer can be introduced into the reaction zone either undiluted or diluted with an inert gas, such as nitrogen or helium.

The dimerization reaction proceeds readily at atmospheric pressure, but pressures departing from atmospheric pressure can be used if desired.

The product exiting from the reaction zone can be recovered in accordance with conventional methods; for example, the product stream can be condensed in a cold trap, such as one maintained at about −78° C. with solid carbon dioxide. The dimer can then be separated from other reaction products, if any, and unreacted monomer by fractional distillation.

The reaction zone can be constructed of any inert material which is capable of withstanding the temperatures employed. Quartz and stainless steel are particularly suitable materials.

The reaction zone can be either unpacked or packed with inert material or a suitable catalyst, such as a deiodinating metal.

Referring to the general formula for the monomer, X, Y, and Z are preferably such that the total number of fluorine atoms in each isopropoxy group is at least 5, more preferably 7, and $n$ is preferably from 1 to 4.

FIG. 1 is a graph showing the percent by weight unreacted monomer and the percent by weight dimer in the product stream as a function of temperature at a residence time of 3 seconds.

Figure 2:
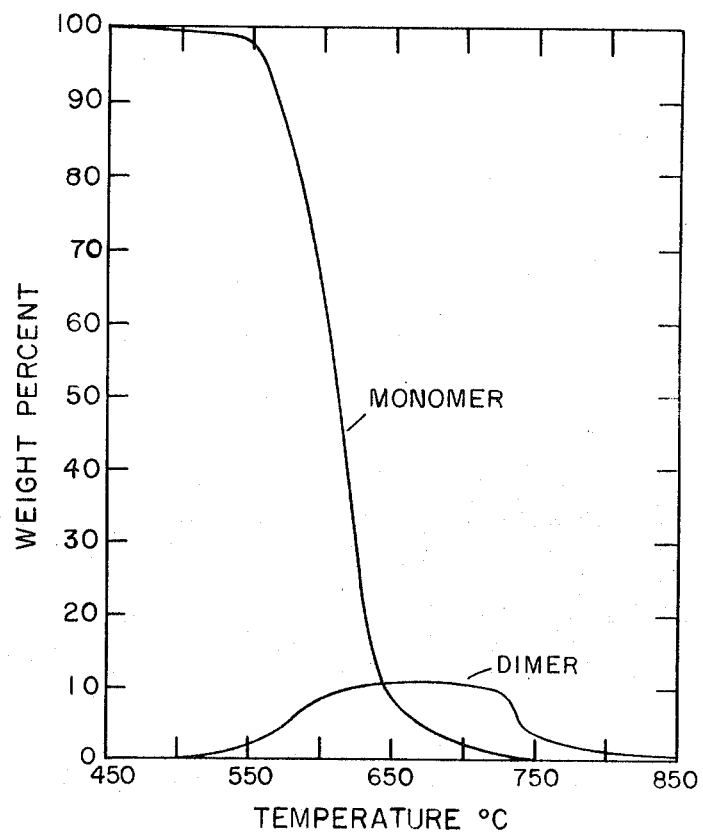
FIG. 2 is a graph showing the percent by weight unreacted monomer and the percent by weight dimer in the product stream as a function of temperature at a residence time of 12 seconds.

The graphs in the figures were constructed from data obtained by passing 1 - (heptafluoroisopropoxy)-2-iodotetrafluoroethane through a reaction zone at the temperatures indicated. The reaction zone was the interior of an unpacked quartz tube having an inside diameter of 8 millimeters and a length of 27 centimeters. The tube was encased in ceramic material containing electrical heating elements capable of raising the temperature of the reaction zone up to 900° C. The temperature in the reaction zone was measured by a thermocouple placed in contact with the quartz tube.

A gas flow of dry helium was maintained through the reaction zone. Prior to entering the reaction zone, the helium was preheated to about 450° C. by being passed through ⅛ inch coiled copper tubing contained within a preheater furnace. Each sample of 1-(heptafluoroisopropoxy) - 2 - iodotetrafluoroethane was injected into the preheated helium gas stream through an injection port located at the inlet end of the quartz tube.

The composition of the product streams exiting from the quartz tube was determined by infrared spectrum analysis of the stream after it had been passed through a gas chromatograph.

The data from which the graphs were constructed are tabulated below.

| Temperature °C. | Residence time | | | |
|---|---|---|---|---|
| | 3 seconds | | 12 seconds | |
| | Monomer percent | Dimer percent | Monomer percent | Dimer percent |
| 450 | 100 | 0 | 100 | 0 |
| 525 | | | 95 | 1.5 |
| 550 | 98 | 2 | | |
| 575 | | | 53 | 8.4 |
| 600 | 63 | 8.5 | | |
| 625 | | | 6.2 | 10.1 |
| 650 | 8.7 | 10.6 | 2.3 | 10.1 |
| 700 | | | 0.9 | 8.6 |
| 725 | 0.9 | 10 | | |
| 750 | 0 | 3.5 | 0.3 | 6.3 |
| 850 | 0 | 0.6 | 0 | 0.8 |

In addition to the runs reported in the above table, three runs following the same general procedure were made by passing 1 - (heptafluoroisopropoxy)-8-iodohexadecafluorooctane,

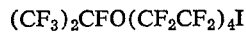

through a stainess steel tube having an inside diameter of 6 millimeters and a length of 16 centimeters. The residence time in each run was 6 seconds. The results obtained are tabulated below.

| Temperature, °C. | Monomer percent | Dimer percent |
|---|---|---|
| 560 | 70.6 | 6.2 |
| 575 | 51.2 | 9.8 |
| 610 | 22.6 | 15.0 |

We claim:

1. A continuous process for preparing α,ω-bis(fluoroperhaloisopropoxy)perfluoroalkanes having the formula

wherein X, Y, and Z are independently fluorine or chlorine, with the total number of fluorine atoms on each isopropoxy group being at least three, and $n$ is an integer from 1 to 5, which process comprises continuously passing an α - (fluoroperhaloisopropoxy)-ω-iodoperfluoroalkane having the formula

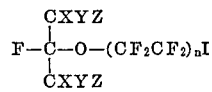

wherein X, Y, Z, and $n$ have the meanings given above, through a reaction zone having a temperature between about 450° C. and about 900° C. at a rate such that the residence time is from about 0.02 to about 100 seconds.

2. The process of claim 1 wherein the total number of fluorine atoms on each isopropoxy group is at least 5.

3. The process of claim 2 wherein the total number of fluorine atoms on each isopropoxy group is 7.

4. The process of claim 1 wherein the residence time is from about 0.1 to about 15 seconds.

5. The process of claim 4 wherein the total number of fluorine atoms on each isopropoxy group is at least 5.

6. The process of claim 4 wherein the total number of fluorine atoms on each isopropoxy group is 7 and $n$ is from 1 to 4.

7. The process of claim 6 wherein the temperature is from about 450° C. to about 750° C.

References Cited
UNITED STATES PATENTS

| | | | |
|---|---|---|---|
| 3,317,618 | 5/1967 | Haszeldine | 260—653 |
| 2,894,971 | 7/1959 | O'Rear et al. | 260—653 X |
| 3,435,078 | 3/1969 | Nychka et al. | 260—615 R |
| 2,035,386 | 3/1936 | Salzberg | 260—615 R |

HOWARD T. MARS, Primary Examiner